2,898,189
Patented Aug. 4, 1959

2,898,189

PROCESS FOR PREPARING ALKALI METAL TRI-PHOSPHATES, ALKALI METAL PYROPHOS-PHATES AND MIXTURES THEREOF

Franz Rodis and Gerhard Hartlapp, Knapsack, near Koln, and Klaus Beltz, Hurth, near Koln, Germany, assignors to Knapsack-Griesheim Aktiengesellschaft, Knapsack, near Koln, Germany, a corporation of Germany No Drawing. Application March 7, 1955
Serial No. 492,765

Claims priority, application Germany March 8, 1954

4 Claims. (Cl. 23—107)

The present invention comprises alkali metal triphosphates, alkali metal pyrophosphates and mixtures thereof as well as a process of preparing same, in a single phase, by heating a mixture obtained by neutralizing orthophosphoric acid with a certain amount of alkali metal carbonates or alkali metal hydroxides.

According to the known processes, the production of alkali metal triphosphates has, up to now, been effected exclusively in the rotary furnace. When proceeding in this manner, the starting material consists of a mixture of primary and secondary orthophosphate with a mol-proportion of $P_2O_5:Na_2O$ equal to 3:5, and the mixture is heated in the rotary furnace to temperatures of 300° C. to 400° C. These known processes also allow to use as starting material any other phosphates inasfar as the above mentioned mol-proportion of $P_2O_5:Na_2O$ is maintained.

When proceeding according to the known processes, it is even more favourable to start from orthophosphoric acid and to neutralize it by means of alkali metal carbonates or alkali metal hydroxides until it contains about 67% of disodiumphosphate corresponding to a mol-proportion of $P_2O_5:Na_2O$ equal to 3:5. The mixture is then calcined and charged into the rotary furnace.

It is also known that the conversion of orthophosphates, pyrophosphates or metaphosphates respectively into triphosphates takes place in a particularly short time, if the mixture to be converted is comminuted into an especially fine powder, i.e. if it is present in fine distribution. It has, therefore, heretofore been proposed to spray the orthophosphoric acid, neutralized to the required mol-proportion of $P_2O_5:Na_2O$, by means of a nozzle, either directly into the rotary furnace or into a spraying tower and then supply it, in finest dispersion, into the rotary furnace.

The known processes, however, entail disadvantages, as they need several operation phases and relatively long reaction periods which disadvantageously influence the yields per unit of time and volume.

Now, we have found a new process according to which the conversion of the orthophosphate into the triphosphate phase is effected in a short time, i.e. in about 2 to 15 seconds. When proceeding according to the process covered by the invention, it is possible to obtain highest conversions at smallest volume.

The new process of preparing alkali metal triphosphates, alkali metal pyrophosphates and mixtures thereof comprises neutralizing orthophosphoric acid with alkali metal carbonates or alkali metal hydroxides or mixtures thereof, said alkali metal compounds being used in such an amount as to form a mixture having a molar proportion of $P_2O_5:$ alkali metal oxide in the range from 1:2 to 3:5 and spraying the mixture so obtained for instance by means of nozzles in a spraying tower, while simultaneously heating said mixture. For the production of alkali metal triphosphate such an amount of alkali metal carbonates or alkali metal hydroxides is added to the orthophosphoric acid as to provide a molar proportion of $P_2O_5:$ alkali metal oxide equal to 3:5; while for the production of alkali metal pyrophosphate such an amount of alkali metal carbonates or alkali metal hydroxides is added to the orthophosphoric acid as to provide a molar proportion of $P_2O_5:$ alkali metal oxide equal to 1:2.

Any desired mixture of pyro- and triphosphate can be prepared by adjusting the mol-proportion of $P_2O_5:$ alkali oxide within the range from 1:2 to 3:5.

In this way, and this is surprising, a very voluminous alkali metal triphosphate of highest purity is obtained, the loose weight of which is very low, i.e. less than about 600 grams/liter. The expression "loose weight" means the weight of 1 liter of the material filled loosely, without any shaking, into a measuring cylinder. The material is obtained in a granular structure, readily soluble, and contains but very slight amounts of dust particles. Therefore, it does not stick together when being stored. When using nozzles operated at a considerably elevated pressure, it is even possible to reduce the loose weight of the sprayed products to a value less than about 200 grams/liter and to obtain the salts in a particularly characteristic ball form.

Up to now, those skilled in the art were of the opinion that the formation of triphosphate needs a certain time of tempering. It has been found, and this being surprising, that this tempering may completely be avoided and that it is possible to obtain triphosphate from orthophosphate in a very short time.

When performing the new process, the conditions maintained during the spraying of the mixture are such as to cause a temperature of the evolving waste gases within the range from about 200° C. and about 500° C., preferably 250° C.–380° C. The spraying may be performed and the waste gases are caused so as to leave the tower at the aforementioned temperatures. The moisture content of the waste gases is between 60 g. of $H_2O$ and 400 grams of $H_2O$ per kilo of waste gas. The major part of the heat carried along with the waste gases can be recovered by means of a heat exchanger so that only the evaporation and conversion heat have to be generated. The output of the spraying tower only depends upon the heat available; the latter can be easily introduced in a very large extent.

The process is especially suitable for preparing a pure, voluminous alkali metal triphosphate free of trimetaphosphate.

The new process, therefore, comprises the production of alkali metal triphosphate or alkali metal pyrophosphate or mixtures thereof in one phase of operation only. To this end, orthophosphoric acid is sprayed for instance by means of nozzles in a spraying tower, this orthophosphoric acid having been neutralized to a mol-proportion of $P_2O_5:Na_2O$ or $K_2O$ respectively equal to 3:5 in the case of alkali metal triphosphate, and 1:2 in the case of pyrophosphates, 1:2 to 3:5 in the case of mixtures thereof.

The waste gases should leave the spraying tower at a temperature of 200° C.–500° C., preferably at 250° C.–380° C., and have a moisture content of 60 grams to 200 grams of water per kilo of waste gas.

The following examples serve to illustrate the invention but they are not intended to limit it thereto; the parts being by weight unless otherwise stated.

Example 1

50 kilos of orthophosphoric acid of 75% strength and 34.5 kilos of anhydrous sodium carbonate of 98% strength are dissolved in 37.5 liters of water and sprayed, by means of nozzles, in a spraying tower. The temperature of the waste gases is nearly about 380° C. and the moisture content amounts to 100 grams of $H_2O$ per kilogram of waste gas. A sodium triphosphate containing 57% of total $P_2O_5$ is obtained in a yield of 98% determined at about 97% of $Na_5P_3O_{10}$.

*Example 2*

75 kilos of orthophosphoric acid of 75% strength are diluted by 57 liters of water and neutralized by means of 53.4 kilos of sodium carbonate of 98% at about 60° C. to about 90° C. The solution is sprayed in a spraying tower at a temperature of 400° C. A voluminous triphosphate of a purity of about 96% is obtained. The goods yield practically amounts to 100%.

*Example 3*

17.5 kilos of orthophosphoric acid of 32.5% of $P_2O_5$ are neutralized with 8.13 kilos of sodium carbonate of 98% strength at 60° C. to 100° C. The mixture is sprayed at about 300° C. and the moisture content of the waste gas adjusted to 200 grams of $H_2O$/kilogram. A voluminous mixture containing 53.7% of $P_2O_5$ is obtained which is identified as 75% of sodium pyrophosphate and 24% of sodium triphosphate. The yield amounts to about 98%.

*Example 4*

10 kilos of orthophosphoric acid of 57% of $P_2O_5$ are neutralized in the presence of 7.5 liters of water by means of 8.44 kilos of sodium carbonate of 98% at 60° C. to 100° C. The mixture is sprayed at 320° C. A product containing 53% of total $P_2O_5$ is obtained, the latter comprising 88.6% of sodium pyrophosphate. The rest up to 100% is constituted by sodium triphosphate. The yield amounts to 98%.

We claim:

1. A process for preparing alkali metal triphosphates, alkali metal pyrophosphates and mixtures thereof, said process being characterized by the steps of providing an aqueous solution of phosphoric acid that has been neutralized to form alkali metal salts, the molar proportion of orthophosphoric acid relative to the alkali metal in the solution being between 1:2 and 3:5, and converting the solution to the desired product by spraying said solution into a reaction zone while simultaneously heating said solution to a temperature sufficient to form waste gases having a temperature of between about 200° C. and 500° C., there being a sufficient amount of water present in said aqueous solution to provide a water content in said waste gases of about 60–400 grams of water for each kilo of waste gases, and the conversion taking place within a period of about 2–15 seconds.

2. The process of claim 1 wherein the molar proportion of $P_2O_5$:alkali metal oxide is 3:5, the resulting product being an alkali metal triphosphate.

3. The process of claim 1 wherein the molar proportion of $P_2O_5$:alkali metal oxide is 1:2, the resulting product being an alkali metal pyrophosphate.

4. The process of claim 1 wherein the waste gas temperature is from about 250° C. to about 380° C.

References Cited in the file of this patent

UNITED STATES PATENTS

| | | |
|---|---|---|
| 1,984,146 | Lindberg | Dec. 11, 1934 |
| 1,984,968 | Fiske | Dec. 18, 1934 |
| 1,998,182 | Anable et al. | Apr. 16, 1935 |
| 2,182,357 | Schwartz | Dec. 5, 1939 |
| 2,776,187 | Pfrengle | Jan. 1, 1957 |

FOREIGN PATENTS

| | | |
|---|---|---|
| 495,192 | Great Britain | Nov. 8, 1938 |